(12) United States Patent
Yang

(10) Patent No.: US 11,797,185 B2
(45) Date of Patent: *Oct. 24, 2023

(54) SOLID-STATE DRIVE CONTROL DEVICE AND LEARNING-BASED SOLID-STATE DRIVE DATA ACCESS METHOD

(71) Applicant: SHENZHEN DAPU MICROELECTRONICS CO., LTD., Shenzhen (CN)

(72) Inventor: Jing Yang, Shenzhen (CN)

(73) Assignee: SHENZHEN DAPU MICROELECTRONICS CO., LTD., Shenzhen (CN)

(*) Notice: Subject to any disclaimer, the term of this patent is extended or adjusted under 35 U.S.C. 154(b) by 164 days.

This patent is subject to a terminal disclaimer.

(21) Appl. No.: 17/398,357

(22) Filed: Aug. 10, 2021

(65) Prior Publication Data

US 2021/0365214 A1 Nov. 25, 2021

Related U.S. Application Data

(63) Continuation of application No. 16/249,897, filed on Jan. 17, 2019, now Pat. No. 11,119,694, which is a
(Continued)

(30) Foreign Application Priority Data

Aug. 19, 2016 (CN) .......................... 201610690097.2

(51) Int. Cl.
*G06F 3/06* (2006.01)
*G06N 20/00* (2019.01)
(Continued)

(52) U.S. Cl.
CPC ................ *G06F 3/061* (2013.01); *G06F 3/06* (2013.01); *G06F 3/0611* (2013.01);
(Continued)

(58) Field of Classification Search
CPC ............. G06F 12/0862; G06F 16/9574; G06F 9/3802–3816; G06F 9/383;
(Continued)

(56) References Cited

U.S. PATENT DOCUMENTS 9,323,680 B1 4/2016 Salli et al.
2007/0143547 A1 6/2007 Farmer et al.
(Continued)

FOREIGN PATENT DOCUMENTS

CN 101419543 A 4/2009
CN 101540017 A 9/2009
(Continued)

OTHER PUBLICATIONS

Carlos Maltzahn et. al., "A Feasibility Study of Bandwidth Smoothing on the World-Wide Web Using Machine Learning", Feb. 1999, Compaq Computer Corporation and University of Colorado Boulder, pp. 1-22 (Year: 1999).*
(Continued)

*Primary Examiner* — Curtis James Kortman
(74) *Attorney, Agent, or Firm* — Bayes PLLC

(57) ABSTRACT

The invention discloses a solid-state drive control device and a learning-based solid-state drive data access method, wherein the method comprises the steps of: presetting a hash table, the hash table comprising more than one hash value, the hash value is used to record and represent data characteristics of data pages in the solid-state drive. Obtaining an I/O data. stream of the solid-state drive, and obtaining a hash value corresponding to the I/O data stream in the hash table. Predicting a sequence of data pages and/or data pages that are about to be accessed by a preset first learning model. Prefetching data is performed in the solid-state drive based on an output result of the first learning model. Through the embodiment of the present invention, when predicting
(Continued)

prefetched data, learning can be performed in real time to adapt to different application categories and access modes through adaptive adjustment parameters, so that better data prefetching performance can be obtained.

18 Claims, 3 Drawing Sheets

Related U.S. Application Data continuation of application No. PCT/CN2017/097330, filed on Aug. 14, 2017.

(51) Int. Cl.
  *G06N 5/04* (2023.01)
  *G06N 3/092* (2023.01)

(52) U.S. Cl.
  CPC .......... *G06F 3/0653* (2013.01); *G06F 3/0659* (2013.01); *G06F 3/0673* (2013.01); *G06N 5/04* (2013.01); *G06N 20/00* (2019.01); *G06N 3/092* (2023.01)

(58) Field of Classification Search
  CPC . G06F 9/30047; G06F 2212/602–6028; G06F 3/0659; G06F 3/06; G06F 3/0611; G06F 3/0653; G06F 3/0673; G06F 3/061; G06F 3/0679; G06F 3/0635; G06N 20/00; G06N 3/054; G06N 3/006; G06N 3/092; G06N 3/08; G06N 3/0454
  See application file for complete search history.

(56) References Cited

U.S. PATENT DOCUMENTS

| | | |
|---|---|---|
| 2014/0149668 A1 | 5/2014 | Chaudhary |
| 2014/0351188 A1 | 11/2014 | Bagg |
| 2015/0074337 A1 | 3/2015 | Jo et al. |
| 2015/0281390 A1 | 10/2015 | Kovvuri et al. |
| 2015/0317357 A1 | 11/2015 | Harmsen et al. |
| 2016/0266796 A1 | 9/2016 | Iwata |
| 2016/0323358 A1 | 11/2016 | Malhotra et al. |
| 2017/0123988 A1 | 5/2017 | Chun et al. |

FOREIGN PATENT DOCUMENTS

| | | |
|---|---|---|
| CN | 102033769 A | 4/2011 |
| CN | 105512051 A | 4/2016 |
| CN | 106250064 A | 12/2016 |

OTHER PUBLICATIONS

Leeor Peled et. al., "Semantic locality and context-based prefetching using reinforcement learning", Jun. 2015, Proceedings of the 42nd Annual International Symposium on Computer Architecture (ISCA '15). Association for Computing Machinery, New York, NY, USA, pp. 285-297 (Year: 2015).*
International Search Report issued in parallel PCT Application No. PCT/CN2017/097330, dated Nov. 16, 2017, 2 pages.
First Office action issued in parallel Chinese Application No. 201610690097.2, dated Nov. 19, 2018, 7 pages.
Jun Wang et al., "Learning to Hash for Indexing Big Data—A Survey", Sep. 17, 2015, IEEE, pp. 1-22 (Year: 2015).
Alex Krizhevsky et. al., "Using Very Deep Autoencoders for Content-Based Image Retrieval", Apr. 27, 2011, ESANN, pp. 1-7 (Year: 2011).
G. E. Hinton et al., "Reducing the Dimensionality of Data with Neural Networks", Jul. 28, 2006, Science, vol. 303, Issue 5786, pp. 504-507 (Year: 2006).

* cited by examiner

SOLID-STATE DRIVE CONTROL DEVICE AND LEARNING-BASED SOLID-STATE DRIVE DATA ACCESS METHOD

CROSS-REFERENCE TO RELATED APPLICATIONS

The present application is a continuation of U.S. application Ser. No. 16/249,897, filed on Jan. 17, 2019, entitled "SOLID-STATE DRIVE CONTROL DEVICE AND LEARNING-BASED SOLID-STATE DRIVE DATA ACCESS METHOD," which is a continuation of International Application No. PCT/CN2017/097330, filed on Aug. 14, 2017, which claims priority to Chinese Patent Application No. 201610690097.2, filed on Aug. 19, 2016, all of which are incorporated herein by reference in their entireties.

FIELD OF THE INVENTION

The present invention relates to the field of computers, and more particularly to a solid-state drive control device and a learning-based solid-state drive data access method.

BACKGROUND

Solid-state Drives (SSDs) are drives made from solid-state electronic storage chip arrays. The solid-state drives include control units and storage units (typically FLASH memory chips).

The storage unit widely used in solid-state drives is generally a NAND flash memory. Such a storage unit cannot directly perform an overwrite operation at a location where original data is stored. The specific reason is that, firstly, the byte in the NAND flash memory can only be changed from 1 to 0, otherwise it cannot be realized. In addition, for a write operation of a solid-state drive, the smallest unit of operation is a page. Based on these two characteristics, all write operations need to be performed on a new page with all bytes being all 1. This achieves the storage of data by changing the byte that needs to become 0 in a new page with all 1 to 0 and retaining the byte that should be 1.

In the above storage method, a specific process of preparing a new page in which all bytes are all 1 for a write operation includes erasing data in units of data blocks in a storage unit. That is, all bytes of each page in the entire data block are changed to 1, and these pages are used to write new data.

In order to improve the access performance of the SSD, the prior art includes a data prefetching technique based on stride. The inventors have found through research that the stride-based data prefetching technique in the prior art includes at least the following disadvantages: when the SSD's data access process involves more types of applications and access modes, in particularly, the stored data is unstructured data such as files, non-related database big data and the like, the prefetching performance of the data prefetching based on the stride will be reduced or even inoperable.

SUMMARY OF THE DISCLOSURE

The technical problem to be solved by the present invention is how to improve the reading performance of the SSD, specifically:

embodiments of the present invention provide a learning-based data access method, which accurately predicts patterns, rules, addresses, frequencies, etc. of future data accesses by means of machine learning based on the history of I/O data access, including steps:

presetting a hash table, the hash table including more than one hash value; the hash value is used to record and represent data characteristics of data pages in the solid-state drive; the data characteristics include access history data of the data page, a current I/O operation type and address of the data page, an access frequency of the data page, and a re-reference interval of the data page, a data category of the data page, and a file name, a file type, and a file size of the file to which the data page belongs;

obtaining an I/O data stream of the SSD, and obtaining a hash value corresponding to the I/O data stream in the hash table;

predicting a sequence of data pages and/or data pages to be accessed by a preset first learning model, the first learning model takes as input a data characteristic in the first data characteristic set, the first data characteristic set is a data characteristic set required to obtain a prediction result of the first learning model, the data characteristics in the first data characteristic set are obtained based on the hash value:

data prefetching is performed in the solid-state drive based on an output result of the first learning model.

Preferably, in the embodiment of the present invention, when the I/O data stream of the SSD is the data to be written to be written to the SSD, the method further includes the following steps:

grouping the data to be written by a preset second learning model in such a manner that the data to be written is divided into different groups based on whether the rewriting time between the data to be written is similar; the second learning model takes as input a data characteristic in a second data characteristic set: the second data characteristic set is a data characteristic set required to obtain a prediction result of the second learning model; the data characteristics in the second data characteristic set is obtained based on the hash value;

determining a target data block in the solid-stale drive for the data to be written based on information of the grouping of the data to be written.

Preferably, in the embodiment of the present invention, the first learning model and/or the second learning model is a reinforcement learning type learning model.

Preferably, in the embodiment of the present invention, the learning algorithm in the first learning model and/or the second learning model is a deep learning structure.

Preferably, in the embodiment of the present invention, in the algorithm structure of the deep learning, dividing the plurality of neural structure layers into a coding layer and a decoding layer that are mutually symmetric to one another, by centering on the result characteristic set generated by an output layer in the plurality of neural structure layers included in an algorithm structure of the deep learning;

establishing a symmetry relationship between the coding layer and the decoding layer;

when learning by the learning model, the weight matrix of each coding layer is transposed as a weight matrix of the decoding layer corresponding to the coding layer.

In another aspect of the embodiment of the present invention, a SSD control device is further provided, including:

a hash table maintenance unit, configured to preset a hash table, and the hash table includes one or more hash values, the hash value is used to record and represent data characteristics of data pages in the solid-state drive, the data characteristics include access history data of the data page, a current I/O operation type and address of the data page, an access frequency of the data page, and a re-reference interval of the data page, a data category of the data page, and a file name, a file type, and a file size of the file to which the data page belongs;

a data acquisition unit, configured to acquire an I/O data stream of the SSD, and obtain a hash value corresponding to the I/O data stream in the hash table;

a first learning model for predicting a data page and/or a sequence of data pages that are about to be accessed; the first learning model is input with data characteristics in the first data characteristic set; the first data characteristic set is a data characteristic set required to obtain a prediction result of the first learning model; the data characteristics in the first data characteristic set is obtained based on the hash value;

prefetch unit, configured to perform data prefetching in the solid-state drive based on an output result of the first learning model.

Preferably, in the embodiment of the present invention, it is further included:

a second learning model is configured to group the data to be written in a manner of dividing the data to be written into different groups based on whether the rewriting time between the data to be written is similar; the second learning model takes as input a data characteristic in a second data characteristic set; the second data characteristic set is a data characteristic set required to obtain a prediction result of the second learning model; the data characteristics in the second data characteristic set are obtained based on the hash value;

a determining unit, configured to determine, based on information of the grouping of the data to be written, a target data block in the solid-state drive for the data to be written.

Preferably, in the embodiment of the present invention, the first teaming model and or the second learning model is a reinforcement learning type learning model.

Preferably, in the embodiment of the present invention, the learning algorithm in the first learning model and/or the second learning model is a deep learning structure.

Preferably, in the embodiment of the present invention, the first learning model and/or the second learning model further includes an algorithm control unit;

the algorithm control unit includes:

a logical partitioning component, configured to divide the plurality of neural structure layers into a coding layer and a decoding layer that are mutually symmetric to one another, by centering on the result characteristic set generated by an output layer in the plurality of neural structure layers included in the algorithm structure of the deep learning.

a corresponding component, used to establish a symmetry relationship between the coding layer and the decoding layer;

an alternative component, configured to, when learning by the learning model, transpose the weight matrix of each coding layer as a weight matrix of a decoding layer corresponding to the coding layer.

In the embodiment of the present invention, a corresponding data characteristic is established for a data page in the solid-state drive by using a preset hash table. The specific way is to establish a hash value corresponding to each data page in the hash table. The plurality of sequence values included in the hash value of each data page are respectively obtained based on a plurality of data characteristics of the data page. The hash value of the data page is then constructed by the plurality of sequence values. The plurality of data characteristics in the embodiment of the present invention may be respectively access history data of the data page, a current I/O operation type and address of the data page, an access frequency of the data page, and a re-reference interval of the data page, a data category of the data page, and the file name, file type, and file size of the file to which the data page belongs.

In the embodiment of the present invention, by identifying the I/O data stream of the solid-state drive, the data characteristics of each data can be obtained based on the hash value corresponding to the data in the data stream. Next, the purpose of the preset first learning model is to predict the data page that are about to be accessed. Machine learning is performed by selecting desired data characteristics from multiple data characteristics to predict the data pages that are about to be accessed. Since the pre-fetched data is predicted by the embodiment of the present invention, during the data prefetching, learning can be performed in real time to adapt to different application categories and access modes. Therefore, it is possible to accurately predict the regularity, sequence, address space, access frequency, and read/write ratio of future I/O. Ultimately, you get better data prefetch performance and access counts and performance.

Further, in the embodiment of the present invention. When the I/O data stream of the solid-state drive is the data to be written to the solid-state drive. It is also possible to predict the rewriting time of the data to be written based on the set data characteristics by pre-setting the second learning model, and further, the data to be written can be grouped. Since the data in each group has similar rewrite times, when the data in the solid-state drive is rewritten, the situation that there are valid pages and invalid pages in one data block can be reduced, by writing the same set of data into the same data block in the SSD, so that the problem of write amplification can be effectively reduced.

BRIEF DESCRIPTION OF THE DRAWINGS

In order to more clearly illustrate the embodiments of the present application or the technical solutions in the prior art, the drawings to be used in the embodiments or the prior art description will be briefly described below. It is apparent that the drawings in the following description are only some of the embodiments described in the present application, and those skilled in the art can obtain other drawings based on these drawings without any creative work.

DETAILED DESCRIPTION

The technical solutions in the embodiments of the present invention will be clearly and completely described below in conjunction with the accompanying drawings in the embodiments of the present invention. It is apparent that the described embodiments are only a part of the embodiments of the invention, and not all of the embodiments. All other embodiments obtained by those skilled in the art based on the embodiments of the present invention without creative efforts are within the scope of the present invention.

Figure 1:
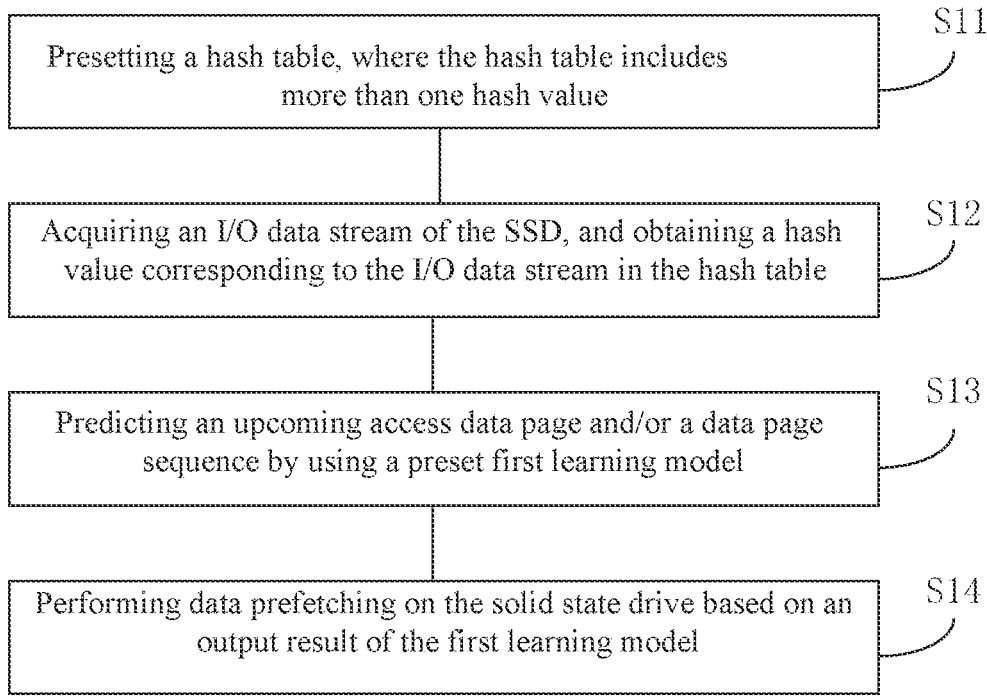
FIG. 1 is a schematic diagram of steps of a learning-based solid-state drive data access method according to the present application.

In order to improve the read performance of the solid-state drive, in the embodiment of the present invention, a learning-based data access method is provided, as shown in FIG. 1, including steps:

S11. Presetting a hash table, Where the hash table includes more than one hash value. The hash value is used to record and represent data characteristics of data pages in the solid-state drive. The data characteristics include access history data of the data page, a current I/O operation type and address of the data page, an access frequency of the data page, and a re-reference interval of the data page, a data category of the data page, and a file name, a file type, and a file size of the file to which the data page belongs;

Each data page stored in a solid-state drive has its own specific attributes. In the embodiments of the present invention, these specific attributes are referred to as data characteristics. Specifically, there may be many types of data characteristics, including: the file to which the data page belongs (i.e., the file name of the tile to which the data page belongs), and the file type and file size of the file. Further, the data characteristics may further include many types such as access history data of the data page, a current I/O operation type and address of the data page, an access frequency of the data page, a re-reference interval of the data page, and data categories of data pages. In the embodiment of the present invention, the access history data of the data page may specifically be an I/O operation record for the data page within a certain period of time. The I/O operation record includes a mode, a time, a frequency, and the like, of the I/O operation. In addition, in the embodiment of the present invention, the data category of the data page mentioned refers to a category division for characterizing the read/write characteristics of the data, such as whether the data is read-only data, one-write multi-read data, or frequently-written data.

In an embodiment of the invention, multiple data characteristics of each data page may be embodied in the form of a sequence of hash values. Specifically, each data characteristics of a data page can be recorded as a sequence value. All sequence values are combined into a hash value, and all data characteristics of this data page can be recorded by the hash value. The hash table is a collection of hash values corresponding to multiple data pages in the SSD. This allows access to the hash table to obtain the various data characteristics of the data pages in the SSD.

S12. Acquiring an I/O data stream of the SSD, and obtaining a hash value corresponding to the I/O data stream in the hash table.

The performance of data prefetching is reflected in the prefetch hit rate. The higher the hit rate, the higher the prefetch performance. The core solution of the embodiment of the present invention is to associate the current I/O data and data stream of the solid-state drive with the upcoming data page access by means of machine learning. To achieve the purpose of predicting upcoming data access.

The association between the current I/O data and data streams and upcoming data page accesses can include many types. For example, if the currently acquired I/O data stream belongs to a particular file name (file A), then another file (file B) associated with the file is accessed. At this time, if the file B is prefetched into the cache by acquiring the I/O data stream and analyzing that the data stream belongs to the file A, the read performance of the solid-state drive is effectively improved.

Further, by analyzing the access history data of the data page, it is known that the file (file C) to which the data page X belongs is accessed at a specific time every day (For example, file C can be a play file of an alarm, and the file is read periodically at 8 o'clock every morning for playing), then, if the file C is prefetched into the cache in advance before playing at 8 o'clock every day, the read performance of the SSD can be effectively improved.

The correlation influence between the data characteristics of I/O data and data streams and the subsequent data access rules also includes many types. Therefore, it is feasible and effective to predict impending access by analyzing the data characteristics of I/O data and data streams.

S13. Predicting an upcoming access data page and/or a data page sequence by using a preset first learning model; the first learning model takes as input a data characteristic in the first data characteristic set. The first data characteristic set is a data characteristic set required to obtain a prediction result of the first learning model. The data characteristics in the first data characteristic set are obtained based on the hash value.

The data characteristics that can be used for prediction can be varied, and the mechanism of influence of each data characteristics on the prediction result is also different. In addition, a data page in the data stream has different data characteristics. As well, the relationship of data characteristics between different data pages in a data stream can also affect the prediction results.

In the embodiment of the present invention, after the learning model is established with the goal of predicting the data page that are about to be accessed, the data characteristics for inputting the learning model can be obtained according to the current I/O data stream of the solid-state drive. The data characteristics may be obtained by obtaining a hash value corresponding to each data page in the I/O data stream in the hash table, and then obtaining a sequence value for recording each data characteristic in the hash value. In the embodiment of the present invention, the manner of recording the data characteristics of the data pages in the solid-state drive by using the hash table can effectively improve the recording efficiency and access efficiency of the data characteristics.

In an embodiment of the invention, the learning model for predicting data pages that are about to be accessed may be referred to as a first learning model. The data characteristics required by the first learning model can be selected from the hash values of the data pages as needed. In the embodiment of the present invention, a data characteristic set required by the first learning model may be referred to as a first data characteristic set.

The output result of the first learning model determines which data pages need to be prefetched. The percentage of data pages that are accessed in these prefetched data pages in a short period of time in the overall prefetched data (i.e., the accuracy of prefetched data) directly affects the read performance of the SSD. The higher the accuracy of the prefetched data page, the higher the read performance of the SSD, whereas, the lower the read performance of the SSD.

Figure 3:
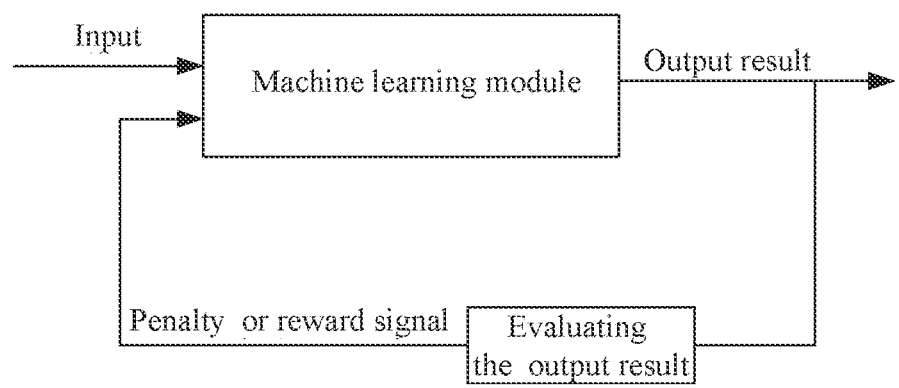
FIG. 3 is a schematic structural diagram of a reinforcement learning model described in the present application.

In order to improve the accuracy of the prefetched data, as shown in FIG. 3, the first learning model may also be a Reinforcement Learning (RL) learning model. In this way, a pre-fetch performance indicator for SSD data can be set. When the output result of the first learning model fails to reach the prefetch performance indicator or the prefetch performance indicator decreases, a penalty value may be fed back as an input of the machine learning module in the first learning model to adjust the weight of the data characteristics. When the output result of the first learning model causes the prefetch performance indicator to rise, a reward value can be fed back as an input of the first learning model to stimulate and increase the weight of the valid data characteristics.

S14. Performing data prefetching in the solid-state drive based on an output result of the first learning model.

In an embodiment of the invention, the output result of the first learning model predicts access to an upcoming data page and/or sequence of data pages. Therefore, based on the results of the first learning model, it is possible to predict which data pages will be accessed soon. Therefore, the data reading efficiency of the solid-state drive can be improved by prefetching the data in these data pages to the cache. Since the pre-fetched data is predicted by the embodiment of the present invention, learning can be performed in real time to adapt to different application categories and access modes. Thus, it is possible to accurately predict the regularity, sequence, address space, access frequency, and read/write ratio, etc. of future I/O. Ultimately, you get better data prefetching performance, access counts and performance.

Figure 4:
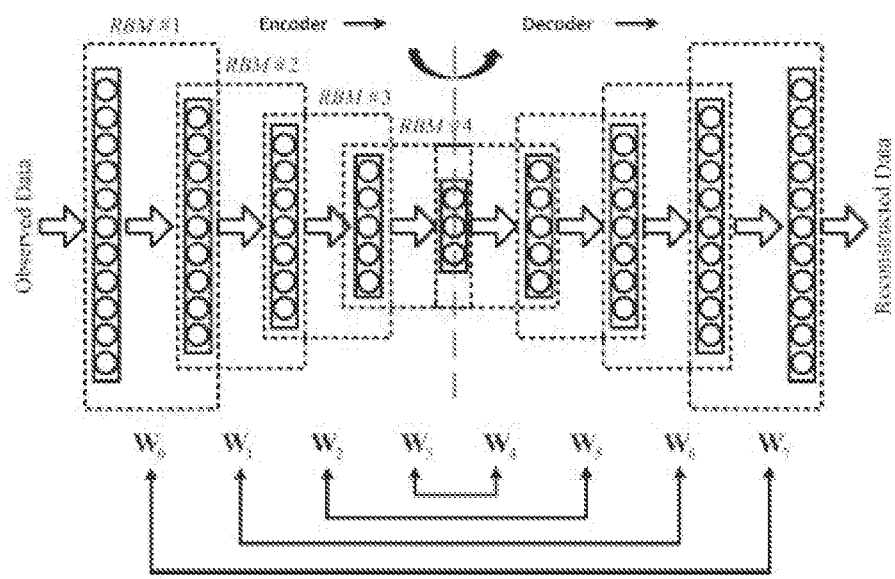
FIG. 4 is a schematic structural view of a deep learning neural structure layer according to the present application.

Further, in the embodiment of the present invention, deep learning (DL, Deep Learning) and reinforcement learning may also be combined to construct a learning model in the embodiment of the present invention. In this way, the learning model can be automatically adjusted to ensure that the output result is not degraded (i.e., it has the effect of enhancing learning). In addition, through deep learning, the data characteristics as input can be simplified or new data characteristics can be generated. Thereby reducing the number of parameters of the learning model that adjust the input parameters. Based on the characteristics of deep learning, the learning model in the embodiment of the present invention can continuously accumulate experience over time. This can continue to improve the effect. Further, in order to save the computational resources of the learning model, and to improve the output efficiency of the output result of the learning model. In the embodiment of the present invention, the calculation mode of the learning model is also improved. Specifically, in the embodiment of the present invention, a plurality of neural structure layers in a learning model having deep learning characteristics are logically divided. As shown in FIG. 4, the algorithm structure of the depth calculation includes a plurality of neural structure layers, wherein the output layer for outputting the result includes the result characteristic set generated by the layer. As shown in FIG. 4, the result characteristic set is the center position of the algorithm structure of the entire depth calculation. The neural structure layers on the left side of the result characteristic set are all coding layers, and the neural structure layers on the right side of the result characteristic set are all decoding layers. In this way, the plurality of neural structure layers is divided into coding layer and decoding layer that are mutually symmetric to one another by centering on the result characteristic set.

Next, the coding layer and the decoding layer in the depth-calculated learning model are established in a symmetrical correspondence relationship. That is, the first neural structure layer on the left corresponds to the first neural structure layer on the right, the second neural structure layer on the left corresponds to the second neural structure layer on the right, and so on. After the above correspondence is established, when learning is performed by the learning model. It is possible to transpose the weight matrix of each coding layer as a weight matrix of the decoding layer corresponding to the coding layer. That is to say, the calculation process of the replaced weight matrix is saved by replacing the weight matrix that has been obtained by the corresponding weight matrix. For example, after the weight matrix of each layer of the coding layer (such as the respective neural structure layers on the left side in FIG. 4) is calculated, when the calculation of each neural structure layer of the decoding layer is performed, it can be directly applied at the weight matrix obtained by the coding layer based on the correspondence of the above symmetry. That is, the first neural structure layer of the right number directly uses the weight matrix calculated by the first neural structure layer of the left. The second neural structure layer on the right directly uses the weight matrix calculated by the second neural structure layer on the left, and so on.

It can be seen from the above that, through the calculation mode in the embodiment of the present invention, it can save the calculation time of half of the weight matrix. In addition, the computational resources of the learning model are effectively saved, and the output result is more rapid, which improves the real-time performance of the learning model.

Figure 2:
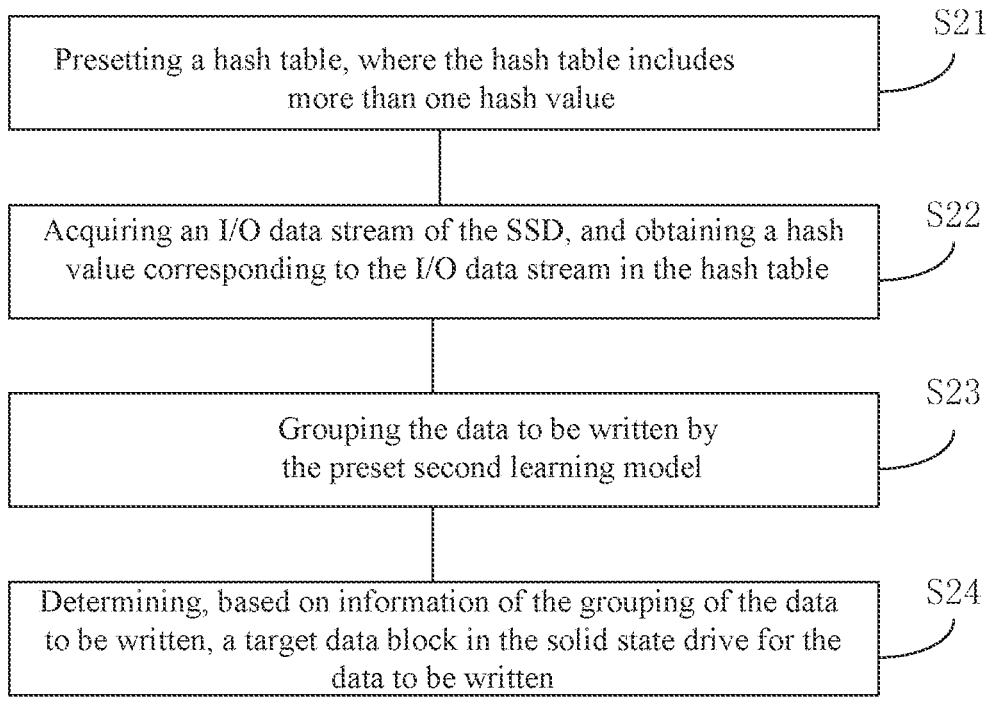
FIG. 2 is a schematic diagram of another step of the data access method for learning-based solid-state drive in the present application.

Further, in order to improve the service life of the solid-state drive, to reduce the problem of write amplification of the solid-state drive, in the embodiment of the present invention, the step of grouping data to be written may also be included. By dividing the data to be written having similar rewrite times into the same group, the same group of data to be written is written into the same data block. Thus, the data pages in each data block in the SSD are basically rewritten synchronously. Therefore, the problem of write amplification can be effectively reduced; as shown in FIG. 2, the steps are as follows:

S21. presetting a hash table, wherein the hash table includes more than one hash value. The hash value is used to record and represent data characteristics of data pages in the solid-state drive. The data characteristics include access history data of the data page, a current I/O operation type and address of the data page, an access frequency of the data page, and a re-reference interval of the data page, a data category of the data page, and a file name, a file type, and a file size of the file to which the data page belongs;

S22. acquiring an I/O data stream of the SSD, and obtaining a hash value corresponding to the I/O data stream in the hash table.

In this embodiment, the specific technical content and effect of presetting a hash table, obtaining of the I/O data stream of the solid-state drive and obtaining the hash value corresponding to the data stream in the hash table are consistent with the description in the embodiment corresponding to FIG. 1. We won't go into details here.

S23. grouping the data to be written by the preset second learning model. The manner of grouping is based on whether the rewriting time between the data to be written is similar. The data to be written is divided into different groups. The second learning model takes as input a data characteristic in a second data characteristic set. The second data characteristic set is a data characteristic set required to obtain a prediction result of the second learning model. The data characteristics in the second data characteristic set are obtained based on the hash value;

In the present embodiment, the purpose of the second learning model is different from the first learning model described above. The purpose of the second learning model is to group the data to be written to the solid-state drive. By dividing data with similar rewriting times in the data to be written into the same group, each data page in a single data block in the solid-state drive is basically rewritten synchronously. The specific way of grouping can be described as:

When the data to be written is divided into three groups of A, B, and C, the three groups of A, B, and C to be written are respectively written into different data blocks. Two or more sets of data to be written cannot be written in the same data block.

Similar to the embodiment corresponding to FIG. 1, in the embodiment, the structure of the second learning model may also be a reinforcement learning module or a way of enhancing the learning module and the deep learning module. In addition, in order to save the computational resources of the learning model, and to improve the real-time nature of the learning model, in the embodiment of the present invention, the calculation mode of the learning model can also be improved in the same manner as in the corresponding embodiment of FIG. 1, specifically:

A plurality of neural structure layers in a learning model having deep learning characteristics are logically divided. The algorithm structure of the depth calculation includes a plurality of neural structure layers, wherein the output layer for outputting the result includes a result characteristic set generated by the layer. As shown in FIG. 4, the result characteristic set is the center position of the algorithm structure of the entire depth calculation. The neural structure layers on the left side of the result characteristic set are all coding layers. The neural structure layers on the right side of the result characteristic set are all decoding layers. In this way, the plurality of neural structure layers is divided into two mutually symmetric neural structure layers: a coding layer and a decoding layer, centering on the result characteristic set.

Then, the corresponding component establishes a symmetry relationship between the encoding layer (Encoder) and the decoding layer (Decoder) in the learning model of the depth calculation. That is, the first neural structure layer on the left corresponds to the first neural structure layer on the right, and the second neural structure layer on the left corresponds to the second neural structure layer on the right, and so on. After the above correspondence is established, when learning by the learning model, the weight matrix of each coding layer may be transposed as a weight matrix of the decoding layer corresponding to the coding layer. That is to say, the calculation process of the replaced weight matrix is saved by replacing the corresponding weight matrix that has been obtained by the corresponding weight matrix. For example, after the weight matrix of each layer of the coding layer (such as the respective neural structure layers on the left side in FIG. 4) is calculated, when the calculation of each neural structure layer of the decoding layer is performed, it can be directly applied at the weight matrix obtained by the coding layer based on the correspondence of the above symmetry. That is, the first neural structure layer of the right number directly uses the weight matrix calculated by the first neural structure layer of the left (i.e., W0 is directly used as W7). The second neural structure layer on the right directly uses the weight matrix calculated by the second neural structure layer of the left (i.e., W1 is used directly as W6), and so on.

It can be seen from the above that, through the calculation mode in the embodiment of the present invention, it can save the calculation time of half of the weight matrix. In addition, the computational resources of the learning model are effectively saved, and the output result is more rapid, which improves the real-time performance of the learning model.

S24. determining, based on information of the grouping of the data to be written, a target data block in the solid-state drive for the data to be written.

After the grouping of the learning model, the data to be written can be written into different data blocks based on the group.

In this embodiment, the data pages in each data block in the solid-state drive are basically rewritten synchronously. Thus, when a data page in the data block is rewritten, most of the other data pages in the data block are quickly rewritten. Thereby, the occurrence of the situation that the valid data page and the invalid data page often exist in the same data block is reduced, and the write amplification problem can be effectively reduced.

It should be noted that both the first learning model and the second learning model in the embodiment of the present invention may be a reinforcement learning model, and thus may be applicable to different scenarios. Specifically, supermarkets and banks are two different scenarios, and the access scenarios for these two scenarios are quite different. Through reinforcement learning, the embodiments of the present invention can continuously accumulate experience in the machine learning process over time, and obtain better performance indicators in different scenarios.

Figure 5:
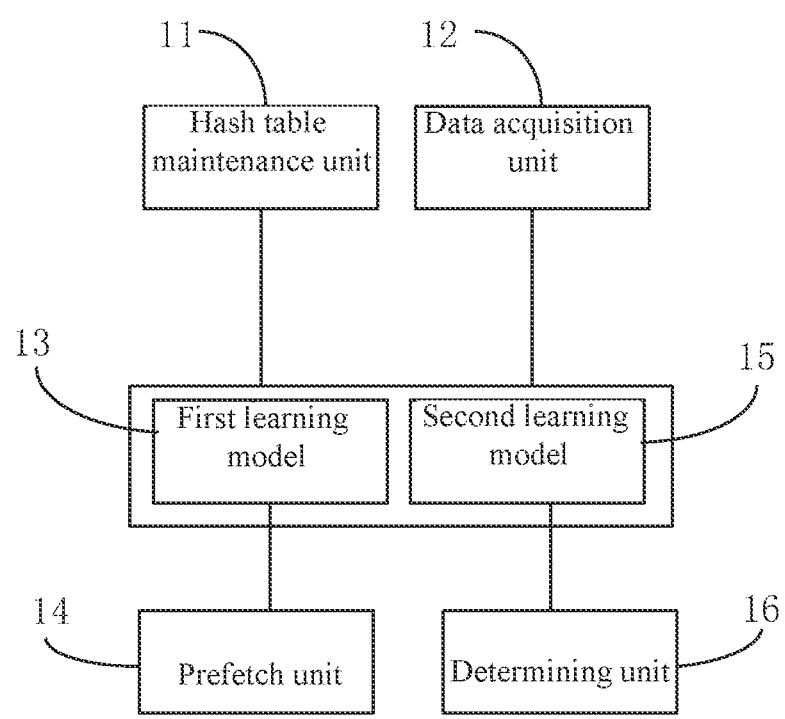
FIG. 5 is a schematic structural diagram of a solid-state drive control device according to the present application.

In another aspect of an embodiment of the present invention, a control device for a solid-state drive is also provided. As shown in FIG. 5, the solid-state control device includes: a hash table maintenance unit 11, a data acquisition unit 12, a first learning model 13, and a prefetch unit 14.

The hash table maintenance unit 11 is configured to preset a hash table, and the hash table includes one or more hash values. The hash value is used to record and represent data characteristics of data pages in the solid-state drive. The data characteristics include access history data of the data page, a current I/O operation type and address of the data page, an access frequency of the data page, and a re-reference interval of the data page, a data category of the data page, and a file name, a file type, and a file size of the file to which the data page belongs.

The data acquisition unit 12 can be configured to acquire an I/O data stream of the SSD, and obtain a hash value corresponding to the I/O data stream in the hash table.

The first learning model 13 is used to predict the sequence of data pages and/or data pages that are about to be accessed. The first learning model 13 takes as input a data characteristic in the first data characteristic set. The first data characteristic set is a data characteristic set required to obtain a prediction result of the first learning model 13. The data characteristics in the first data characteristic set are obtained based on the hash value.

The prefetch unit 14 can be configured to perform data prefetching in the solid-state drive based on an output result of the first learning model 13.

The hash table maintenance unit 11 can record the data characteristics of each data page in the solid-state drive by maintaining a hash table. When the data acquisition unit 12 obtains the real-time data stream, it can analyze the data page that is predicted to be accessed by the first learning model 13. Thereby, the prefetch unit 14 can perform prefetching based on the prediction result of the first learning model 13. Since the pre-fetched data is predicted by the embodiment of the present invention, learning can be performed in real time to adapt to different application categories and access modes, so that better data prefetching performance can be obtained.

Further, in the embodiment of the present invention, the second learning model and the determining unit may be further included, specifically:

second learning model, configured to group the data to be written, in a manner of dividing the data to be written into different groups based on whether the rewriting time between the data to be written is similar; The second learning model takes as input a data characteristic in a second data characteristic set. The second data characteristic set is a data characteristic set required to obtain a prediction result of the second learning model; the data characteristics of the second data characteristic set is obtained based on the hash value;

determining unit, configured to determine, based on information of the grouping of the data to be written, a target data block in the solid-state drive for the data to be written.

Similarly, the data characteristics of each data page in the recorded solid-state drive recorded by the hash table maintenance unit are utilized. When the data acquisition unit acquires the real-time data stream, the data to be written can be grouped by the second learning model. Thus, only one group of data pages is included in a single data block in the solid-state drive. Since the data group rewriting times of the same group are similar, it is possible to effectively reduce the occurrence of both a valid data page and an invalid data page in a single data block. In turn, the problem of write amplification of the solid-state drive can be effectively reduced.

Further, in order to improve the accuracy of the prefetched data, the first learning model and/or the second learning model may specifically be a reinforcement learning type learning model.

In the embodiment of the present invention, deep learning (DL, Deep Learning) and reinforcement learning may also be combined to construct a learning model in the embodiment of the present invention. In this way, the learning model can be automatically adjusted to ensure that the output result is not degraded (i.e., it has the effect of enhancing learning). In addition, through deep learning, the data characteristics as input can be simplified, thereby reducing the number of parameters of the learning model's adjustment input parameters (i.e., having the effect of deep learning).

Further, in order to save the computing resources of the learning model, and to improve the real-time nature of the learning model, in the embodiment of the present invention, the calculation mode of the learning model is further improved by providing the algorithm control unit, wherein the algorithm control unit includes a logical division component, a corresponding component, and an alternative component, wherein:

a logical division component, configured to divide the plurality of neural structure layers into a coding layer and a decoding layer that are mutually symmetric to one another, by centering on the result characteristic set generated by an output layer in the plurality of neural structure layers included in the algorithm structure of the deep learning;

a corresponding component, used to establish a symmetry relationship between the coding layer and the decoding layer;

an alternative component, configured to, when learning by the learning model, transpose the weight matrix of each coding layer as a weight matrix of a decoding layer corresponding to the coding layer.

The logical partitioning component logically divides multiple neural structure layers in a learning model with deep learning characteristics. The algorithm structure of the depth calculation includes a plurality of neural structure layers, wherein the output layer for outputting the result includes a result characteristic set generated by the layer. As shown in FIG. 3, the result characteristic set is the center position of the algorithm structure of the entire depth calculation. The neural structure layers on the left side of the result characteristic set are all coding layers, and the neural structure layers on the right side of the result characteristic set are all decoding layers. In this way, the plurality of neural structure layers is divided into two mutually symmetric neural structure layers: coding layer and decoding layer, centering on the result characteristic set.

Then, the corresponding component establishes a symmetry relationship between the encoding layer (Encoder) and the decoding layer (Decoder) in the learning model of the depth calculation. That is, the first neural structure layer on the left corresponds to the first neural structure layer on the right, and the second neural structure layer on the left corresponds to the second neural structure layer on the right, and so on. After establishing the above correspondence, when learning by the learning model, the substitute component may transpose the weight matrix of each coding layer as the weight matrix of the decoding layer corresponding to the coding layer. That is to say, the calculation process of the replaced weight matrix is saved by replacing the weight matrix that has been obtained by the corresponding weight matrix. For example, after the weight matrix of each layer of the coding layer (such as the respective neural structure layers on the left side in FIG. 4) is calculated, when the calculation of each neural structure layer of the decoding layer is performed, it can be directly applied at the weight matrix obtained by the coding layer based on the correspondence of the above symmetry. That is, the first neural structure layer of the right number directly uses the weight matrix calculated by the first neural structure layer of the left (i.e., W0 is directly used as W7). The second neural structure layer on the right directly uses the weight matrix calculated by the second neural structure layer of the left (i.e., W1 is used directly as W6), and so on.

As can be seen from the above, the calculation time of the weight matrix can be saved by one embodiment of the present invention. In addition, the computational resources of the learning model are effectively saved, and the output result is more rapid, which improves the real-time performance of the learning model.

The control device for the solid-state drive in this embodiment has a corresponding relationship with the learning-based solid-stale drive data access method corresponding to FIG. 1. The technical solutions are substantially the same, and the working principle and the beneficial effects are the same. Therefore, the technical solutions in the embodiments of the present invention can be referred to each other.

In the several embodiments provided by the embodiments of the present invention, it should be understood that the disclosed system, apparatus, and method may be implemented in other manners. For example, the device embodiments described above are merely illustrative. For example, the division of the unit is only a logical function division, and the actual implementation may have another division manner. For example, multiple units or components may be combined or integrated into another system, or some features may be omitted or not implemented. In addition, the coupling or direct coupling or communication connection shown or discussed may be an indirect coupling or communication connection through some interface, device or unit, and may be electrical, mechanical or otherwise.

The units described as separate components may or may not be physically separate, and the components displayed as units may or may not be physical units. It can be located in one place, or it can be distributed to multiple network units. Some or all of the units may be selected based on actual needs to achieve the purpose of the solution of the embodiment.

In addition, each functional unit in each embodiment of the present invention may be integrated into one processing unit, or each unit may exist physically separately, or two or more units may be integrated into one unit. The above integrated unit can be implemented in the form of hardware or in the form of a software functional unit.

The integrated unit, if implemented in the form of a software functional unit and sold or used as a standalone product, may be stored in a computer readable storage medium. Based on such understanding, the technical solution of the present invention may contribute to the prior art or all or part of the technical solution may be embodied in the form of a software product. The computer software product is stored in a storage medium and includes instructions for causing a computer device (which may be a personal computer, server, or network device, etc.) to perform all or part of the steps of the methods described in various embodiments of the present invention. The foregoing storage medium includes: a USB flash drive, a mobile drive, a Read-Only Memory (ROM), a Random Access Memory (RAM), a ReRAM, an MRAM, a PCM, a NAND Flash, a NOR Flash, an Memristor. A variety of media that can store program code, such as a disk or a disc.

The above embodiments are only used to illustrate the technical solutions of the present invention, and are not limited thereto. Although the present invention has been described in detail with reference to the foregoing embodiments, those of ordinary skill in the art will understand. It is still possible to modify the technical solutions described in the foregoing embodiments, or to replace some of the technical features. These modifications and substitutions do not depart from the spirit and scope of the technical solutions of the embodiments of the present invention.

What is claimed is:

1. A method for accessing data of a solid-state drive, comprising:
    obtaining an input/output (I/O) data stream of the solid-state drive
    predicting information related to a data page to be accessed or a data page sequence to be accessed using a learning model, wherein a first input of the learning model includes a plurality of data characteristics associated with the I/O data stream,
        wherein the learning model comprises a reinforcement learning model, a prefetch performance indicator for the data of the solid-state drive is set, and the prefetch performance indicator indicates a prefetch hit rate,
        wherein when an output result of the learning model is less than the prefetch performance indicator or the prefetch performance indicator decreases, a penalty value is fed back as a second input of the learning model to adjust a set of weights in the learning model, and
        wherein when the output result of the learning model causes the prefetch performance indicator to increase, a reward value is fed back as the second input of the learning model to stimulate and increase one or more weights associated with one or more valid data characteristics in the plurality of data characteristics: and
    determining I/O data to be accessed from the solid-state drive based on the predicted information.

2. The method of claim 1, further comprising fetching the determined I/O data into a cache.

3. The method of claim 1, wherein the plurality of data characteristics comprise one or more of access history data of a corresponding data page of the solid-state drive, an address of the corresponding data page, an access frequency of the corresponding data page, a re-reference interval of the corresponding data page, a data category of the corresponding data page, a file name of a file to which the corresponding data page belongs, a file type of the file, and a file size of the file.

4. The method of claim 3, wherein the access history data of the corresponding data page comprises an I/O operation record for the corresponding data page within a period of time.

5. The method of claim 4, wherein the I/O operation record comprises a mode, a time, a frequency, or a combination thereof of an I/O operation.

6. The method of claim 3, wherein the data category of the corresponding data page comprises a category division for characterizing a read/write characteristic of data in the corresponding data page.

7. The method of claim 6, wherein the read/write characteristic of the data in the corresponding data page indicates whether the data in the corresponding data page is read-only data, one-write multi-read data, or frequently-written data.

8. The method of claim 1, wherein the information related to the data page to be accessed or the data page sequence to be accessed comprises at least one of a plurality of data pages of the solid-state drive to be accessed or a sequence of the plurality of data pages.

9. The method of claim 1, wherein
    the learning model comprises an output layer, one or more coding layers, and one or more decoding layers;
    the one or more coding layers and the one or more decoding layers are symmetric to one another with respect to the output layer; and
    a weight matrix of each of the one or more coding layers is transposed as a weight matrix of a respective decoding layer that is symmetric to the coding layer.

10. A device for accessing data of a solid-state drive, comprising:
    a memory configured to store instructions; and
    a processor coupled to the memory and configured to execute the instructions to perform a process comprising:
        obtaining an input/output (I/O) data stream of the solid-state drive;
        predicting information related to a data page to be accessed or a data page sequence to be accessed using a learning model, wherein a first input of the learning model includes a plurality of data characteristics associated with the I/O data stream,
            wherein the learning model comprises a reinforcement learning model, a prefetch performance indicator for the data of the solid-state drive is set, and the prefetch performance indicator indicates a prefetch hit rate,
            wherein when an output result of the learning model is less than the prefetch performance indicator or the prefetch performance indicator decreases, a penalty value is fed back as a second input of the learning model to adjust a set of weights in the learning model, and
            wherein when the output result of the learning model causes the prefetch performance indicator to increase, a reward value is fed back as the second input of the learning model to stimulate and increase one or more weights associated with one or more valid data characteristics in the plurality of data characteristics; and determining I/O data to be accessed from the solid-state drive based on the predicted information.

11. The device of claim 10, wherein the processor is configured to execute the instructions to perform the process further comprising fetching the determined I/O data into a cache.

12. The device of claim 10, wherein the plurality of data characteristics comprise one or more of access history data of a corresponding data page of the solid-state drive, an address of the corresponding data page, an access frequency of the corresponding data page, a re-reference interval of the corresponding data page, a data category of the corresponding data page, a file name of a file to which the corresponding data page belongs, a file type of the file, and a file size of the file.

13. The device of claim 12, wherein the access history data of the corresponding data page comprises an I/O operation record for the corresponding data page within a period of time.

14. The device of claim 13, wherein the I/O operation record comprises a mode, a time, a frequency, or a combination thereof of an I/O operation.

15. The device of claim 12, wherein the data category of the corresponding data page comprises a category division for characterizing a read/write characteristic of data in the corresponding data page.

16. The device of claim 15, wherein the read/write characteristic of the data in the corresponding data page indicates whether the data in the corresponding data page is read-only data, one-write multi-read data, or frequently-written data.

17. The device of claim 10, wherein the information related to the data page to be accessed or the data page sequence to be accessed comprises at least one of a plurality of data pages of the solid-state drive to be accessed or a sequence of the plurality of data pages.

18. The device of claim 10, wherein
the learning model comprises an output layer, one or more coding layers, and one or more decoding layers;
the one or more coding layers and the one or more decoding layers are symmetric to one another with respect to the output layer; and
a weight matrix of each of the one or more coding layers is transposed as a weight matrix of a respective decoding layer that is symmetric to the coding layer.

* * * * *